United States Patent
Zimmerer

(10) Patent No.: US 7,185,318 B1
(45) Date of Patent: Feb. 27, 2007

(54) METHOD, SYSTEM AND COMPUTER PROGRAM FOR COMPARING A FIRST SPECIFICATION WITH A SECOND SPECIFICATION

(75) Inventor: Peter Zimmerer, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/959,892

(22) PCT Filed: Apr. 25, 2000

(86) PCT No.: PCT/DE00/01271

§ 371 (c)(1),
(2), (4) Date: Nov. 13, 2001

(87) PCT Pub. No.: WO00/68789

PCT Pub. Date: Nov. 16, 2000

(30) Foreign Application Priority Data

May 10, 1999 (DE) .................................. 199 21 446

(51) Int. Cl.
*G06F 9/45* (2006.01)
*G06F 9/44* (2006.01)
(52) U.S. Cl. ........................ 717/124; 717/141
(58) Field of Classification Search ........ 717/100–178; 718/100
See application file for complete search history.

(56) References Cited

U.S. PATENT DOCUMENTS

| | | | |
|---|---|---|---|
| 5,481,717 A | * | 1/1996 | Gaboury ..................... 717/126 |
| 5,649,180 A | | 7/1997 | Danno et al. |
| 6,038,378 A | * | 3/2000 | Kita et al. ..................... 714/38 |
| 6,275,976 B1 | * | 8/2001 | Scandura ..................... 717/120 |
| 6,557,146 B1 | * | 4/2003 | Bormann et al. ............... 716/3 |
| 2005/0160410 A1 | * | 7/2005 | Narisawa et al. ........... 717/141 |

OTHER PUBLICATIONS

Zave et al., "Where Do Operations Come From ? A Multiparadigm Specification Technique", IEEE Transactions on Software Engineering, IEEE Inc. New York, US, vol. 22, No. 7, Jul. 1996, pp. 508-528.
van Hee et al., "Proofs: Application Engineering Based on Formal Methods", Microprocessing and Microprogramming 35, Amsterdam, NL, Nos. 1/5, Sep. 1992, pp. 29-36.
Nuseibeh et al., "A Framework for Expressing the Relationships Between Multiple Views in Requirements Specificatioin", IEEE Transaction on Software Engineering, New York, US, vol. 20, No. 10 Oct. 1994, pp. 760-773.
Kim et al., "A New Verification Framework of Object-Oriented Design Specification for Small Scale Software", IEICE Trans. Inf. & Syst., vol. E80-D, No. 1 Jan. 1997, pp. 51-56.
Reif, "Software-Verifikation und ihre Anwendungen", it+ti—Informationstechnik und Technische Informatik, pp. 34-40.
Tai et al., "Testing of Distributed Programs", Parallel and Distributed Computing, Chapter 23, 1995, pp. 955-978.

* cited by examiner

Primary Examiner—Lewis A. Bullock, Jr.
(74) Attorney, Agent, or Firm—Staas & Halsey LLP

(57) ABSTRACT

A method is specified for comparing two specifications which each comprise at least two processes, each of which includes at least two events. A first comparison between the two specifications is carried out with regard to the sequence of the events in the processes, and a second comparison between the two specifications is carried out, taking account of the relationships between events in different processes.

14 Claims, 4 Drawing Sheets

METHOD, SYSTEM AND COMPUTER PROGRAM FOR COMPARING A FIRST SPECIFICATION WITH A SECOND SPECIFICATION

CROSS REFERENCE TO RELATED APPLICATIONS

This application is based on and hereby claims priority to PCT Application No. PCT/DE00/01271 filed on Apr. 25, 2000 and German Application No. 199 21 446.8 filed on May 10, 1999 in Germany, the contents of which are hereby incorporated by reference.

BACKGROUND OF THE INVENTION

The invention relates to a method, a system and a computer program for comparing a first specification with a second specification, with the first specification and the second specification each covering at least two processes, each of which includes at least two events.

Computers are increasingly being used in a computer network, referred to as a computer system, in order to make it possible to use at least some of the services available in the computer system at different positions. In this context, communication between the individual computers, and independently of programs which follow one another on a computer, is an essential characteristic which allows efficient, fast and hence extremely economic operation, particularly due to the capability for concurrent processing.

On example of such a computer system is the Internet, which connects a large number of computers to one another. In this case, a number of processes which run independently of one another in a computer are in particular referred to as subscribers in the computer system.

When processes are being carried out or processed in parallel (concurrently), it is often possible for effects to occur which are difficult to predict, or are completely unpredictable, with regard to the interaction between the processes (see in particular, K. C. Tai, R. H. Carver: Testing of distributed programs; A. Zomaya (ed.): Handbook of Parallel and Distributed Computing; McGraw Hill; 1995; pp. 956–979.). Furthermore, in practice, it is impossible to test the entire computer system for all the possible options and states.

For each type of concurrence, it is often of critical importance to be able to state whether two concurrent processes have the same semantics. The sequence of the events that have occurred may (and also generally will) vary in each run. Nevertheless, these run sequences are semantically equivalent if the sequence changes occur only in the concurrent events. In a sufficiently large system, such as a comparison can be carried out only with very major effort, and is at the same time extremely susceptible to errors.

SUMMARY OF THE INVENTION

An object of one aspect of the invention is to allow a first specification to be compared with a second specification, which comparison process takes place automatically and, in particular, also takes account of concurrent activities in processes.

One possible way to achieve the object, a method is specified for comparing a first specification with a second specification, with the first specification and the second specification each covering at least two processes, each of which includes at least two events. A first comparison is carried out of the events in the processes in the first specification with the events in the processes in the second specification. The mutually associated events in the processes in the two specifications are preferably first of all determined implicitly. Furthermore (building on this), a second comparison is carried out of relationships between the events in the processes in the first specification with relationships between the associated events (the "association" having been determined, in particular, in the first comparison) in the processes in the second specification. The first specification is determined to be different to the second specification if the first or the second comparison results in a dissimilarity. If no such difference is determined, the first specification is regarded as being the same as the second specification.

In this case, it should be noted that the term "the same" means that the two specifications are semantically equivalent to one another. In particular, "differences" are accepted whose influence on the respective specification is irrelevant with regard to the function and/or the semantics of the specification.

An event may, for example, describe the life of a process ("record process", "end process"), and may be used for communication ("Send message to . . . ", "Receive message from . . . :") or for synchronization ("wait for . . . ", "request confirmation from . . . ") between two processes.

One development is for the first comparison and the second comparison each to check a sequence of the events. In this case, the sequence is used as a parameter on the basis of which the comparison is carried out.

There is also a development in which the first specification and the second specification each include information flows over a predetermined time period.

Another development is for the first specification and the second specification each to represent message flows. Such message flows can be described in particular in the form of a specific diagram, referred to as a "Message Sequence Chart" (MSC).

One refinement is for the first specification and the second specification each to describe data flows in a distributed computer system. In particular, the specifications may define concurrent activities (in a computer system). The specifications may expediently be in the form of program code, symbolic notation (MSC or the like), a text description, running or executable program code, or may be in some other form.

The described method is particularly suitable for automated testing and for automated test situation generation. In a distributed system, it is virtually impossible to cover all test situations and to check them explicitly. This is due especially to the exponentially increasing number of options to be tested which relate to processes or to a number of processes taking sky place on one computer, with a large number of computers once again interacting in a computer system. The automatic test situation is generated by running specific routines on computers or processes and, for example, recording them in the form of a message flow. If the specification for a large number of such "test runs" does not change, then the test runs must be semantically equivalent to one another. This can be verified automatically by the described method.

There is one particular refinement in which a successful comparison results in a technical system being designed or controlled. The design expediently includes a redesign or an adaptation of the technical system.

In particular, the method may be used for simulation and/or modeling purposes.

There is another refinement, in which a number of differences are determined between the first specification and the second specification. This is advantageous especially when all the differences are established automatically and are processed in some suitable way for a user. In a situation such as this, the user can clearly see what the difference between the specifications comprises.

It is thus economically possible to deduce possible error sources. This is particularly helpful since, in the case of semantically equivalent specifications and specifications which should be semantically equivalent, verification of a single difference guarantees that these specifications are not semantically equivalent to one another.

In particular, the dissimilarities can advantageously be displayed in graphical form.

In addition, a system for comparing a first specification with a second specification is cited in order to achieve the object, with the first specification and the second specification each covering at least two processes, each of which includes at least two events. The system has a processor unit which is set up such that:

a) a first comparison is carried out of the events in the processes in the first specification with the events in the processes in the second specification;

b) a second comparison is carried out of relationships between the events in the processes in the first specification with relationships between the associated events in the processes in the second specification;

c) the first specification is determined to be different to the second specification as soon as the first or the second comparison results in a dissimilarity; and d) the first specification is determined to be the same as the second specification if the first and the second comparisons do not lead to any differences.

The system also includes permanent or removable storage, such as magnetic and optical discs, RAM, ROM, etc. on which the process and data structures of the present invention can be stored and distributed. The processes can also be distributed via, for example, downloading over a network such as the Internet.

In addition, a computer program for comparing a first specification with a second specification is cited in order to achieve the object, with the first specification and the second specification each covering at least two processes, each of which includes at least two events. The computer program carries out the following steps when run on a processor unit:

a) a first comparison is carried out of the events in the processes in the first specification with the events in the processes in the second specification;

b) a second comparison is carried out of relationships between the events in the processes in the first specification with relationships between the associated events in the processes in the second specification;

c) the first specification is determined to be different to the second specification as soon as the first or the second comparison results in a dissimilarity; and d) the first specification is determined to be the same as the second specification if the first and the second comparisons do not lead to any differences.

The system is particularly suitable for carrying out the method according to one aspect of the invention and for running the computer program according to one aspect of the invention or one of its developments described above.

In this case, it should be noted once again that a difference or a dissimilarity between the specifications is of such a type that semantic equivalence in accordance with the above statements is not guaranteed. A formal "difference" exists which does not count as a difference or dissimilarity in the above sense since it is based, for example, only on a different representation (form) of the specifications (that is to say a different sequence of precisely the same mutually associated events in the processes in the two specifications, which can occur concurrently according to these specifications), but which furthermore still guarantees semantic equivalence.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
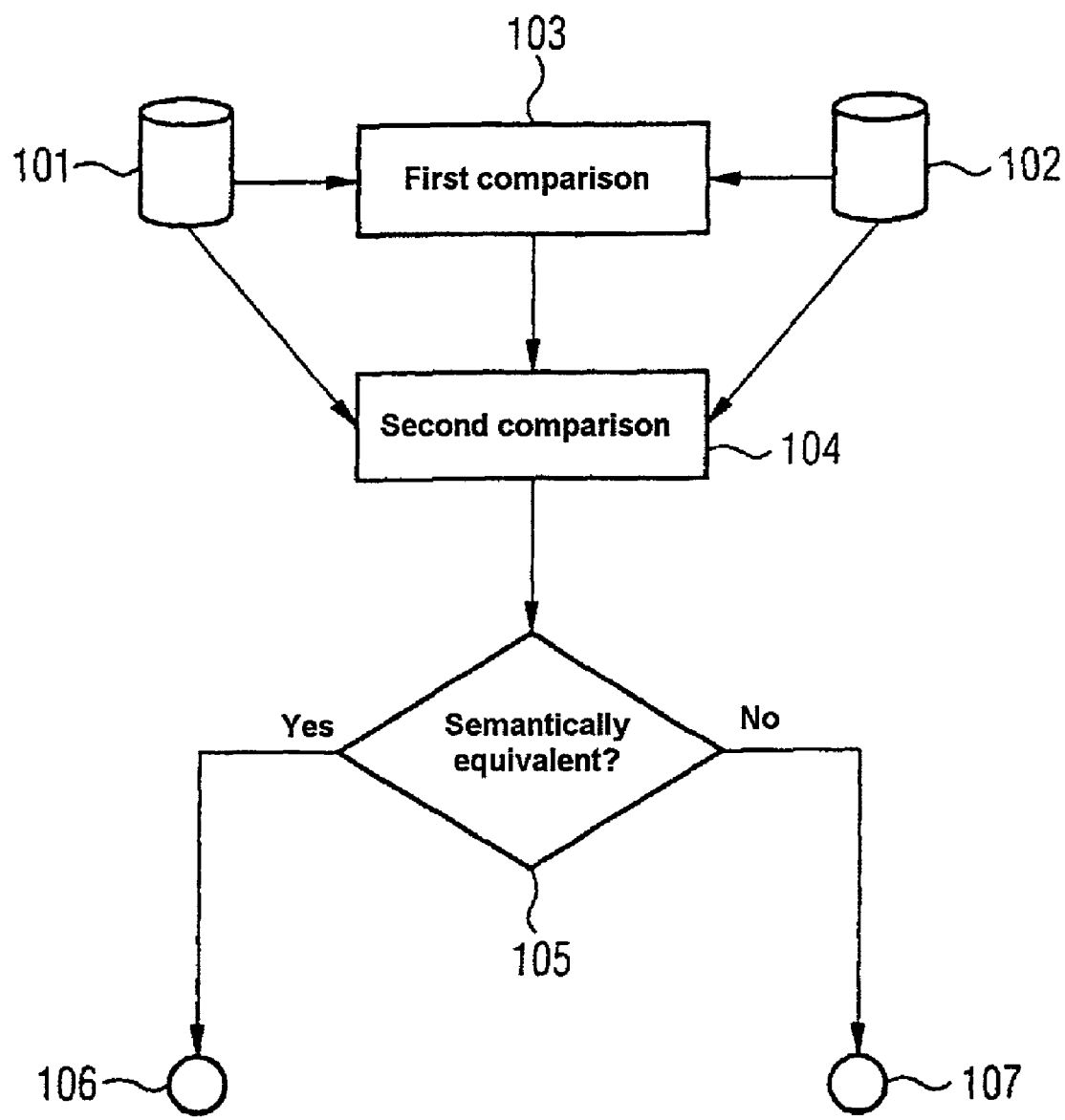
FIG. 1 shows a block diagram with steps in a method for comparing a first specification with a second specification.

Reference will now be made in detail to the preferred embodiments of the present invention, examples of which are illustrated in the accompanying drawings, wherein like reference numerals refer to like elements throughout.

FIG. 1 shows a block diagram with logic method steps for comparing a first specification 101 with a second specification 102. A first comparison is carried out in a block 103, and compares the first specification 101 with the second specification 102 with regard to the events in the processes. With regard to the relationships between the mutually associated events in the processes, the first specification 101 is then checked, building on this, for differences from the second specification 102, in a second comparison 104. A check is carried out in a block 105 as to whether the two specifications 101 and 102 are semantically equivalent, that is to say they have the same functionality irrespective of their particular configurations. If this is true, the specifications 101 and 102 are semantically equivalent and the method is terminated in a step 106, otherwise the method is terminated in a step 107. Optionally, the differences between the first specification 101 and the second specification 102 may also be displayed, in the step 107.

Figure 2:
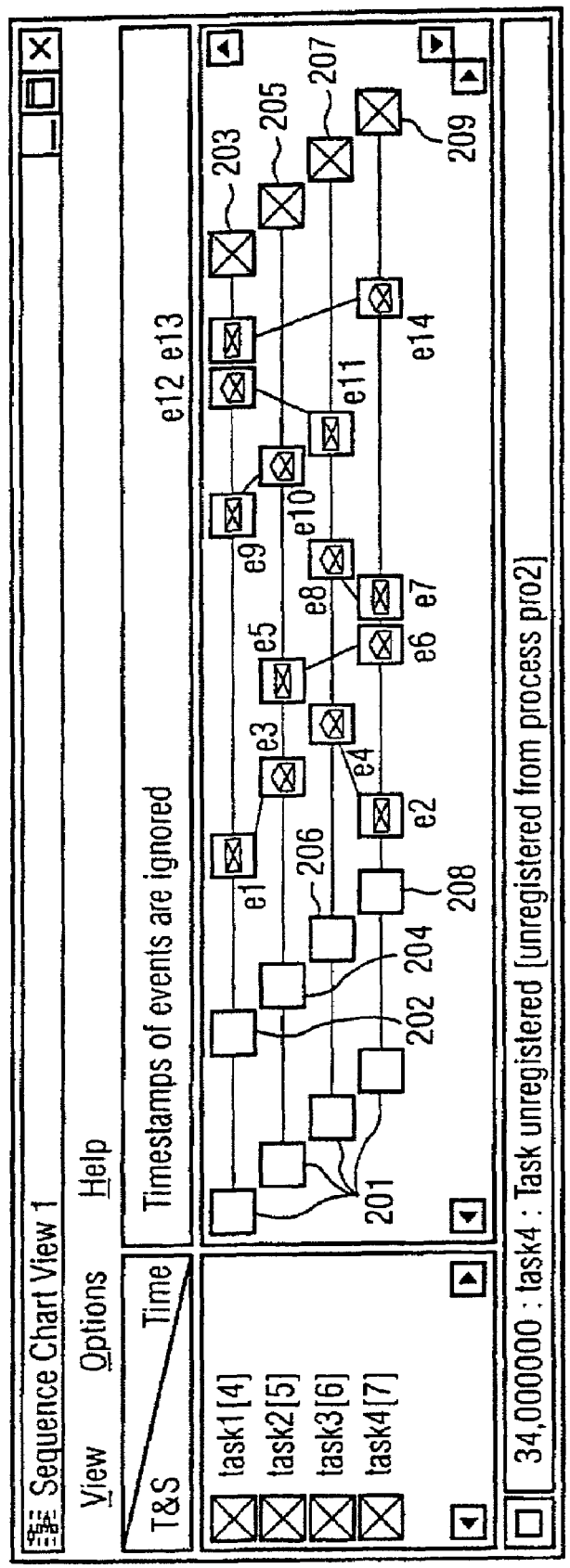
FIG. 2 shows a first specification.
Figure 3:
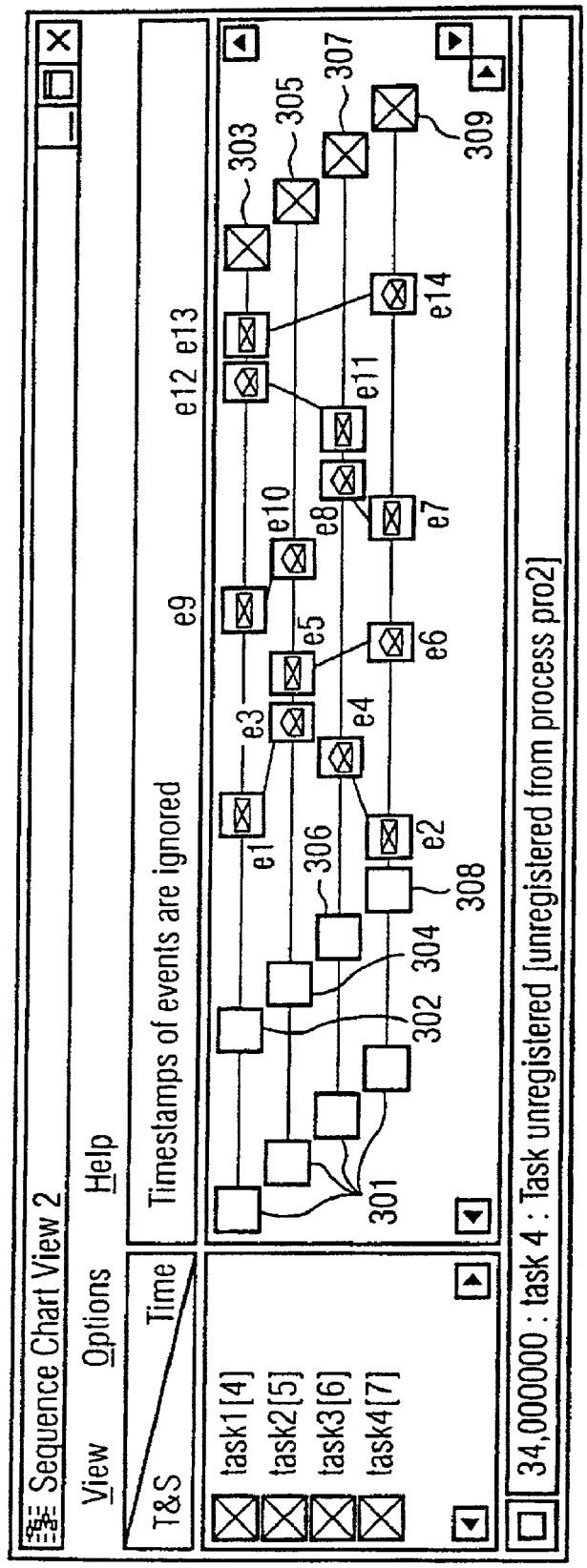
FIG. 3 shows a second specification.

FIGS. 2 and 3 respectively illustrate a first specification and a second specification. The window on the left-hand side in FIGS. 2 and 3 in each case shows four different processes ("tasks") task1 . . . 4. The right-hand part of FIGS. 2 and 3 in each case shows various events $e_i(i=1 \ldots 14)$, plotted on a time axis which runs from left to right. In this case, $e_i(i=1 \ldots 14)$ in each case denotes associated events in the two specifications, that is to say $e_i(i=1 \ldots 14)$ relates to the same event in both the first specification and the second specification. This association between mutually associated events in the two specifications is carried out implicitly in the first comparison.

In this case, it should be noted that the processes can be split hierarchically into different process structures: a network with a large number of computers, each of which has a large number of processes; the processes can in turn be subdivided into individual tasks (the tasks as the smallest unit with sequential control flow). This nomenclature can be subdivided and made hierarchical in any desired form.

The symbol 201 in FIG. 2 indicates that the processor which covers the individual processes task . . . task4 has been started (in the same way as symbol 301 in FIG. 3). The process task1 is started at a symbol 202, and is ended at a symbol 203. The process task2 is started at a symbol 204 and is ended at a symbol 205, the process task3 is started at a symbol 206 and is ended at a symbol 207, the process task4 is started at a symbol 208 and is ended at a symbol 209. The situation in FIG. 3 is analogous to this: symbol 302 starts the process task1 and symbol 303 ends it, symbol 304 starts the process task2 and symbol 305 ends it, symbol 306 starts the process task3 and symbol 307 ends it, and symbol 308 starts the process task4 and symbol 309 ends it.

The events $e_1$ to $e_{14}$ occur in the meantime. A symbol with a closed envelope represents the sending of a message, and a symbol with an open envelope represents the receiving of the sent message. In particular, events (in this case communication events) now occur between the processes task1 to task4, and are represented in the form of links between the processes in FIGS. 2 and 3. Thus, for example, in FIG. 2, the event $e_1$ is defined by a message being sent from the process task1 to the process task2, and being received there (as the event $e_3$). Despite the large number of differences between FIGS. 2 and 3 relating to the sequence of the individual events $e_1$ to $e_{14}$, the two representations in FIGS. 2 and 3 are nevertheless semantically equivalent. This is because the sequence varies only in the events which can occur concurrently. These result from the specification and are, for example, the events $e_1$ and $e_2$, or $e_3$ and $e_4$, or $e_7$ and $e_9$, or $e_8$ and $e_{10}$.

The first comparison thus determines whether the sequences along a process configuration between the two specifications (FIGS. 2 and 3) are semantically equivalent. If the comparison is started with the process task1 (FIG. 2) and the process task1 (FIG. 3), then it is evident that the sequences of the events in these two versions of process task1 are the same:

FIG. 2: task1: $e_1$, $e_9$, $e_{12}$, $e_{13}$

FIG. 3: task1: $e_1$, $e_9$, $e_{12}$, $e_{13}$

Thus, with regard to the first comparison, which compares the structural configuration, in particular the sequence, in the process configuration of two specifications with one another, this results in equivalence (identity, and hence also semantic equivalence) between the process task1 in the first specification shown in FIG. 2 and the process task1 in the second specification shown in FIG. 3. The same applies to the processes task2, task3 and task4.

The second comparison is used to find out whether the relationships between the associated events in the processes in the two specifications do or do not lead to semantic equivalence. Analysis of the relationship between the processes task1 and task2 in FIG. 2 shows that such a relationship ("cross-connection") exists in the form of a communication link between the events $e_1$ and $e_3$. In consequence, it is important that the event $e_5$, which occurs chronologically after the event $e_3$, also occurs after the event $e_1$. This is true in the second specification in FIG. 3. However, in FIG. 2, an event $e_4$ on the process task3 takes place chronologically after the event $e_3$ (process: task2) between the events $e_2$ and $e_5$ (process: task2), while, in FIG. 3, this event $e_4$ occurs at a time before the event $e_3$. Analysis of an overall network in this case shows that this does not prejudice the semantic equivalence of the two specifications in FIGS. 2 and 3. All that is necessary is that the event $e_4$ occurs before the event $e_8$.

Thus, taking account of all the events $e_1$ to $e_{14}$ (some of which are concurrent), semantic equivalence can be deduced from FIGS. 2 and 3. The second comparison shows that the sequence of the event pairs $(e_1, e_3)$ and $(e_2, e_4)$ as well as $(e_7,$ $e_8)$ and $(e_9, e_{10})$, which differ at first glance, in fact actually relate to the concurrent event pairs; the different sequences do not endanger the semantic equivalence of the two specifications.

If a large number of representations as shown in FIGS. 2 and 3 are determined, then it is possible within the course of an automatic test run or test situation generation to determine whether there is any situation in which a dissimilarity occurs even though semantic equivalence would actually be required. In a situation such as this, test runs can be generated, messages recorded and their semantic equivalence then checked, virtually fully automatically. If two specifications are in each case said to be semantically equivalent, then the dissimilarity generally results in an error which, furthermore, can be processed extremely clearly, and can thus be found and rectified very quickly.

Figure 4:
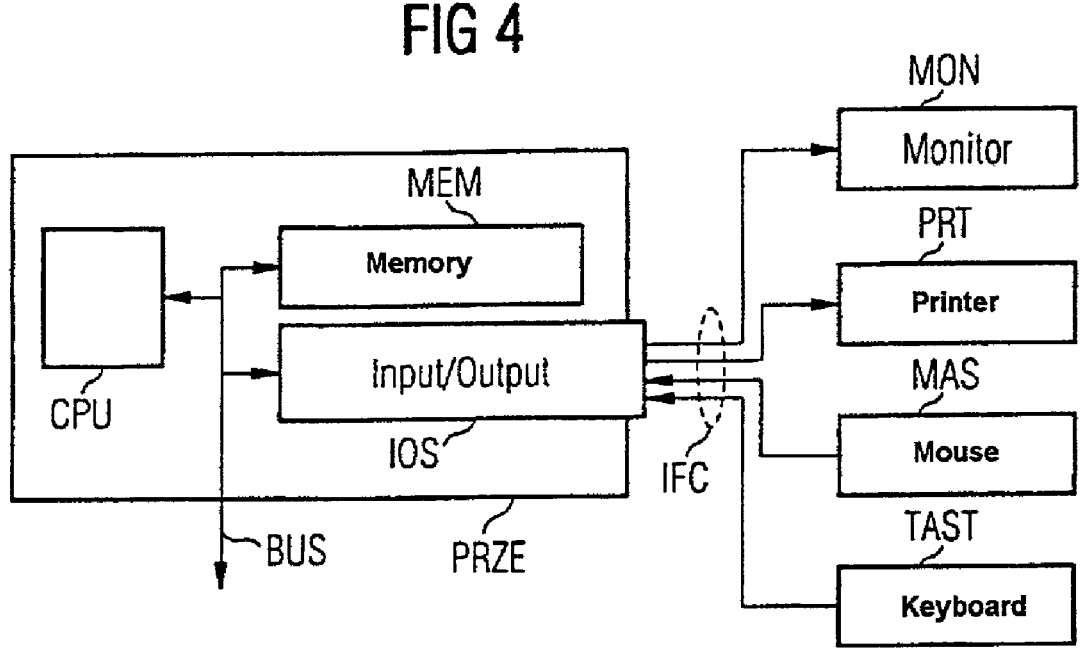
FIG. 4 shows a processor unit.

FIG. 4 shows a processor unit PRZE. The processor unit PRZE has a processor CPU, a memory MEM and an input/output interface IOS, which is used in various ways via an interface IFC: a graphics interface is used to allow an output to be displayed on a monitor MON, and/or to be output on a printer PRT. An input is made via a mouse MAS or a keyboard TAST. The processor PRZE also has a data bus BUS, which ensures the link from a memory MEM, the processor CPU and the input/output interface IOS. Furthermore, additional components, for example additional memories, data stores (hard disc) or a scanner, can be connected to the data bus BUS.

The invention claimed is:

1. A computer-implemented method for comparing a first specification with a second specification, with the first specification and the second specification each covering at least two processes, each of which includes at least two events, comprising:

performing a first comparison to compare the events in the processes of the first specification with the events in the processes of the second specification;

for the first specification, determining semantic associations between events so as to find associated events;

for the second specification, determining semantic associations between events so as to find associated events;

performing a second comparison of associated events in the processes in the first specification and associated events in the processes in the second specification;

determining the first specification to be semantically different from the second specification if the first or the second comparison shows a dissimilarity; and determining the first specification to be semantically the same as the second specification if the first and the second comparisons do not show any difference, wherein the processes of the first specification are performed concurrently with the processes of the second specification, and the first specification and the second specification describe the flow of pieces of data in a distributed computer system.

2. The method as claimed in claim 1, wherein the first comparison and the second comparison are used to check a sequence of the events.

3. The method as claimed in claim 2, wherein the first specification and the second specification each include information regarding the flow of pieces of data with respect to time.

4. The method as claimed in claim 3, wherein the method is an automatic testing procedure.

5. The method as claimed in claim 4, further comprising designing or controlling a technical system if the first and second specifications are determined to be the same.

6. The method as claimed in claim 5, further comprising determining a number of dissimilarities between the first specification and the second specification.

7. The method as claimed in claim 1, wherein the first specification and the second specification each include information regarding the flow of pieces of data with respect to time.

8. The method as claimed in claim 7, wherein the first specification and the second specification represent flow of messages.

9. The method as claimed in claim 1, wherein the method is an automatic testing procedure.

10. The method as claimed in claim 1, further comprising designing or controlling a technical system if the first and second specifications are determined to be the same.

11. The method as claimed in claim 1, further comprising determining a number of dissimilarities between the first specification and the second specification.

12. The method as claimed in claim 11, further comprising displaying the number of dissimilarities.

13. A system having a processor for comparing a first specification with a second specification, with the first specification and the second specification each covering at least two processes, each of which includes at least two events, comprising:
   a first comparison unit to compare the events in the processes in the first specification with the events in the processes in the second specification;
   an association unit to determine associations between events in the first specification and determine associations between events in the second specification, so as to find associated events;
   a second comparison unit to semantically compare associated events in the processes in the first specification with associated events in the processes in the second specification;
   a dissimilarity unit to determine that the first specification is semantically different from the second specification if the first or the second comparison unit shows a dissimilarity, and
   a similarity unit to determine that the first specification is semantically the same as the second specification if the first and the second comparison units do not show any differences; wherein
   the processes of the first specification are performed concurrently with the processes of the second specification; and
   the first specification and the second specification describe the flow of pieces of data in a distributed computer system.

14. A computer readable medium storing a program for performing a process of comparing a first specification with a second specification, with the first specification and the second specification each covering at least two processes, each of which includes at least two events, the process comprising:
   performing a first comparison of the events in the processes in the first specification and the events in the processes in the second specification;
   for both the first and the second specifications, determining semantic associations between events so as to find associated events
   performing a second comparison of associated events in the processes in the first specification and associated events in the processes in the second specification;
   determining the first specification to be semantically different from the second specification if the first or the second comparison shows a dissimilarity; and
   determining the first specification to be semantically the same as the second specification if the first and the second comparisons do not show any differences; wherein
   the processes of the first specification are performed concurrently with the processes of the second specification; and
   the first specification and the second specification describe the flow of pieces of data in a distributed computer system.

* * * * *